US009672037B2

(12) United States Patent
Blasco-Allue et al.

(10) Patent No.: US 9,672,037 B2
(45) Date of Patent: Jun. 6, 2017

(54) ARITHMETIC BRANCH FUSION (71) Applicant: Apple Inc., Cupertino, CA (US)

(72) Inventors: Conrado Blasco-Allue, Sunnyvale, CA (US); Sandeep Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 555 days.

(21) Appl. No.: 13/747,977

(22) Filed: Jan. 23, 2013

(65) Prior Publication Data
US 2014/0208073 A1 Jul. 24, 2014

(51) Int. Cl.
*G06F 9/30* (2006.01)
*G06F 9/38* (2006.01)

(52) U.S. Cl.
CPC ........ *G06F 9/30058* (2013.01); *G06F 9/3001* (2013.01); *G06F 9/30094* (2013.01); *G06F 9/30145* (2013.01); *G06F 9/3804* (2013.01)

(58) Field of Classification Search
None
See application file for complete search history.

(56) References Cited

U.S. PATENT DOCUMENTS 5,381,531 A * 1/1995 Hanawa .............. G06F 9/30167
712/206
6,961,846 B1 * 11/2005 Fleck ................... G06F 9/30021
712/221
7,797,517 B1 * 9/2010 Favor .................. G06F 9/30094
712/215
8,850,164 B2 * 9/2014 Parks .................. G06F 9/30145
712/208
9,483,266 B2 * 11/2016 Loktyukhin ........ G06F 9/30029
(Continued)

FOREIGN PATENT DOCUMENTS

GB          2512725 A   * 10/2014  ......... G06F 9/30029
WO  WO 2010056511 A2  *  5/2010  ........... G06F 9/3873
WO     2012003997         1/2012

OTHER PUBLICATIONS

Sorin, Daniel J; 2012; http://people.ee.duke.edu/~sorin/ece152/lectures/2.2-isa.pdf.*

(Continued)

*Primary Examiner* — Steven Snyder
(74) *Attorney, Agent, or Firm* — Meyertons, Hood, Kivlin, Kowert & Goetzel, P.C.

(57) ABSTRACT

A processor and method for fusing together an arithmetic instruction and a branch instruction. The processor includes an instruction fetch unit configured to fetch instructions. The processor may also include an instruction decode unit that may be configured to decode the fetched instructions into micro-operations for execution by an execution unit. The decode unit may be configured to detect an occurrence of an arithmetic instruction followed by a branch instruction in program order, wherein the branch instruction, upon execution, changes a program flow of control dependent upon a result of execution of the arithmetic instruction. In addition, the processor may further be configured to fuse together the arithmetic instruction and the branch instruction such that a single micro-operation is formed. The single micro-operation includes execution information based upon both the arithmetic instruction and the branch instruction.

20 Claims, 5 Drawing Sheets (56) References Cited

U.S. PATENT DOCUMENTS

| | | | |
|---|---|---|---|
| 2002/0087955 A1* | 7/2002 | Ronen | G06F 9/3001 |
| | | | 717/151 |
| 2007/0260855 A1* | 11/2007 | Gschwind | G06F 9/30014 |
| | | | 712/213 |
| 2009/0198978 A1* | 8/2009 | Greenhalgh | G06F 9/3017 |
| | | | 712/226 |
| 2009/0288075 A1 | 11/2009 | Song et al. | |
| 2011/0138156 A1* | 6/2011 | Awad | G06F 9/30029 |
| | | | 712/223 |
| 2011/0264891 A1* | 10/2011 | Parks | G06F 9/30145 |
| | | | 712/200 |
| 2011/0264896 A1 | 10/2011 | Parks | |
| 2012/0144174 A1 | 6/2012 | Talpes et al. | |
| 2013/0086368 A1* | 4/2013 | Gschwind | G06F 9/3832 |
| | | | 712/226 |
| 2014/0006467 A1* | 1/2014 | Samudrala | G06F 7/5443 |
| | | | 708/501 |
| 2014/0281389 A1* | 9/2014 | Loktyukhin | G06F 9/30196 |
| | | | 712/206 |
| 2014/0281397 A1* | 9/2014 | Loktyukhin | G06F 9/30029 |
| | | | 712/208 |
| 2017/0052788 A1* | 2/2017 | Loktyukhin | G06F 9/3822 |

OTHER PUBLICATIONS

'Conditional and Unconditional Jumps' from University of Maryland (UMD), archived on Jan. 23, 2012.*

'Assembly Language Operations—Comparison Operations' lecture notes from the University of Cambridge, copyright 2006.*

'ARM Compiler toolchain—Version 5.0 Assembler Reference' copyright 2010-2011, ARM.*

* cited by examiner

| Micro-op type | Predication 0/1 | Dest. | Src 1 | Src 2 | Src Arith. Flags | Other |

| SUB | None | R0 | R1 | R2 | None | None |

*405*

| CBZ | 0 | None | R0 | None | None | #Imm |

| SUB-CBZ | 0 | R0 | R1 | R2 | None | #Imm |

FIG. 5

ARITHMETIC BRANCH FUSION

BACKGROUND

Technical Field

The present invention relates generally to the field of processors, and in particular to branch instruction decoding.

Description of the Related Art

Modern processors may take advantage of certain combinations of instructions by fusing two instructions together to form a single operation. More particularly, when a flow control instruction such as a conditional branch instruction follows a compare instruction, for example, the two instructions can be fused to form a single micro-op. This is sometimes referred to as branch fusion. The branch instruction may use the condition code register or processor status register to determine whether or not to cause a program control flow to change (i.e., branch to be taken). The status flags may be modified as a result of execution of a compare instruction, for example. Branch fusion may provide improvements in processing. For example, one benefit may be that the fused micro-op may execute in one execution cycle rather than two. However, in instruction set architectures that include special branch instructions that do not make use of the architectural registers such as the condition code or status registers to decide whether or not to take the branch, a normal branch fusion may not be performed.

SUMMARY OF THE EMBODIMENTS

Various embodiments of a processor and method for fusing together an arithmetic instruction and a branch instruction are disclosed. Broadly speaking, a processor decode unit may be configured to detect an occurrence of an arithmetic instruction followed by a branch instruction in program order. More particularly, the arithmetic instruction may be of the type that doesn't update the architectural flags. The branch instruction, upon execution, changes a program flow of control dependent upon a result of execution of the arithmetic instruction. However, the branch instruction may be of the type which determines whether or not to branch based upon a result in a destination register of the arithmetic instruction, rather than the architectural flags. The processor may fuse together the operations associated with the arithmetic instructions and the branch instruction to form a single operation that may be executed in one execution cycle.

In one embodiment, a processor includes an instruction fetch unit configured to fetch instructions from a memory. The processor may also include an instruction decode unit that may be configured to decode fetched instructions into micro-operations for execution by an execution unit. The decode unit may be configured to detect an occurrence of an arithmetic instruction followed by a branch instruction in program order, wherein the branch instruction, upon execution, changes a program flow of control dependent upon a result of execution of the arithmetic instruction. In addition, the processor may be configured to fuse together the arithmetic instruction and the branch instruction such that a single micro-operation is formed. The single micro-operation includes execution information based upon both the arithmetic instruction and the branch instruction.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Figure 1:
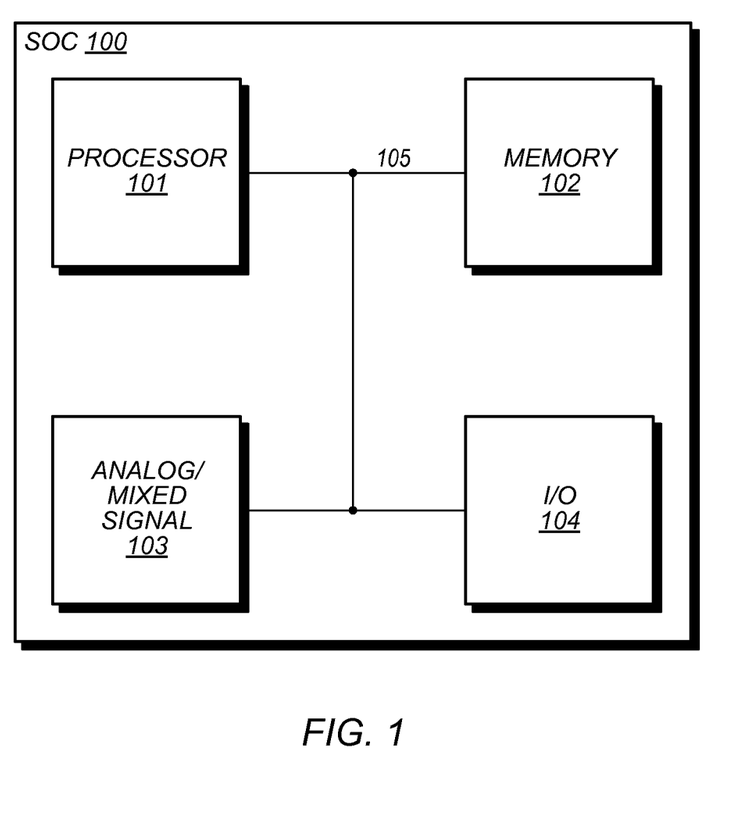
FIG. 1 is a block diagram of one embodiment of a processing system.

Turning now to FIG. 1, a block diagram illustrating one embodiment of a processing system is shown. In the illustrated embodiment, the system is implemented as a system on a chip (SoC) 100. As such, the SoC 100 includes a processor 101 coupled to a memory block 102, an analog/mixed-signal block 103, and an I/O block 104 through an internal bus 105. In various embodiments, SoC 100 may be configured for use in a mobile computing application such as, for example, a tablet computer or a cellular telephone. It is noted that while the processing system is shown as being implemented as an SoC in FIG. 1, it is contemplated that in other embodiments, the processing system may be implemented using discrete components or other combinations of integrations as desired.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a FLASH memory, for example. It is noted that although the embodiment of the SoC of FIG. 1 includes a single memory block, in other embodiments, any suitable number of memory blocks may be employed.

As described in more detail below, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). Furthermore, although a single processor is shown, it is contemplated that in other embodiments, other numbers of processors having one or more cores may be used.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with any number of wireless networks.

I/O block 104 may be configured to coordinate data transfer between SoC 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 101 and one or more devices (e.g., other computer systems or SoCs) coupled to SoC 101 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Figure 2:
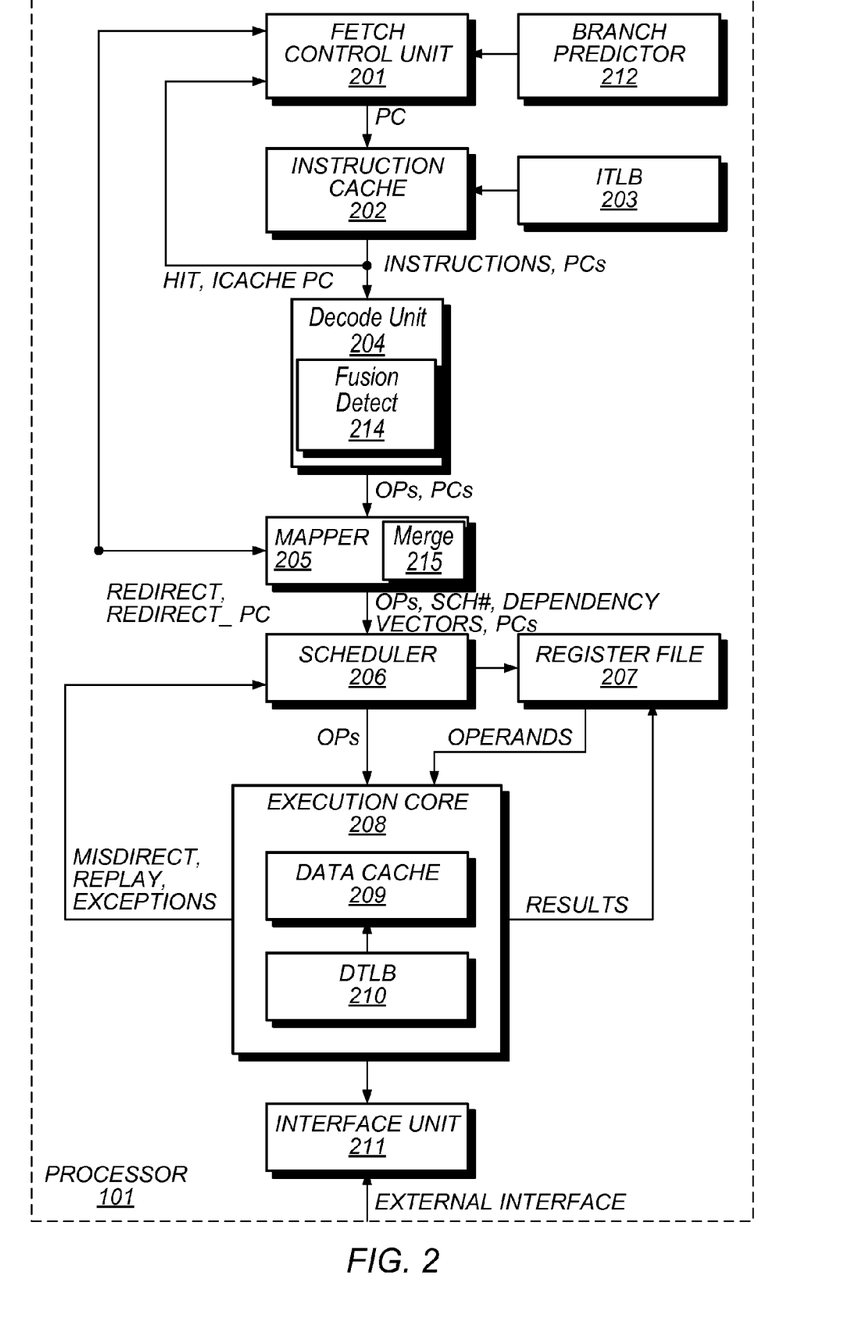
FIG. 2 is a block diagram illustrating more detailed aspects of an embodiment of the processor of FIG. 1.

Referring to FIG. 2, a block diagram of one embodiment of the processor 101 of FIG. 1 is shown. In the illustrated embodiment, the processor 101 includes a fetch control unit 201, an instruction cache 202, a decode unit 204, a mapper 209, a scheduler 206, a register file 207, an execution core 208, and an interface unit 211. The fetch control unit 201 is coupled to provide a program counter address (PC) for fetching from the instruction cache 202. The instruction cache 202 is coupled to provide instructions (with PCs) to the decode unit 204, which is coupled to provide decoded instruction operations (ops, again with PCs) to the mapper 205. The instruction cache 202 is further configured to provide a hit indication and to generate instruction data as an output in response to a PC input. The mapper 205 is coupled to the scheduler 206 and to the fetch control unit 201. The scheduler 206 is coupled to the register file 207 and to the execution core 208. The register file is coupled to the execution core 208. The execution core 208 is coupled to the interface unit 211, which is further coupled to an external interface of the processor 200.

Fetch control unit 201 may be configured to generate fetch PCs for instruction cache 202. In some embodiments, fetch control unit 201 may include one or more types of branch predictors 212. For example, fetch control unit 202 may include indirect branch target predictors configured to predict the target address for indirect branch instructions, conditional branch predictors configured to predict the outcome of conditional branches, and/or any other suitable type of branch predictor. During operation, fetch control unit 201 may generate a fetch PC based on the output of a selected branch predictor. If the prediction later turns out to be incorrect, fetch control unit 201 may be redirected to fetch from a different address.

The instruction cache 202 may be a cache memory for storing instructions to be executed by the processor 200. The instruction cache 202 may have any capacity and construction (e.g. direct mapped, set associative, fully associative, etc.). The instruction cache 202 may have any cache line size. For example, 64-byte cache lines may be implemented in one embodiment. Other embodiments may use larger or smaller cache line sizes. In response to a given PC from the fetch control unit 201, the instruction cache 202 may output up to a maximum number of instructions. It is contemplated that processor 101 may implement any suitable instruction set architecture (ISA), such as, e.g., the ARM™, PowerPC™, or x86 ISAs, or combinations thereof.

In some embodiments, processor 101 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 202 may use virtual address bits for cache indexing and physical address bits for cache tags.

To avoid the cost of performing a full memory translation when performing a cache access, processor 200 may store a set of recent and/or frequently-used virtual-to-physical address translations in a translation lookaside buffer (TLB), such as Instruction TLB (ITLB) 203. During operation, ITLB 203 (which may be implemented as a cache, as a content addressable memory (CAM), or using any other suitable circuit structure) may receive virtual address information and determine whether a valid translation is present. If so, ITLB 203 may provide the corresponding physical address bits to instruction cache 202. If not, ITLB 203 may cause the translation to be determined, for example by raising a virtual memory exception.

The decode unit 204 may generally be configured to decode the instructions into instruction operations (ops). As used herein, the terms micro-operations (micro-ops) and ops may be used interchangeably. Generally, an instruction operation may be an operation that the hardware included in the execution core 208 is capable of executing. Each instruction may translate to one or more instruction operations which, when executed, result in the operation(s) defined for that instruction being performed according to the instruction set architecture implemented by the processor 101. In some embodiments, each instruction may decode into a single instruction operation. The decode unit 16 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 204 and mapper 205 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

As shown, the decode unit 204 also includes a fusion detect unit 214. In one embodiment, the fusion detect unit 214 may be configured to detect conditions in which an arithmetic instruction is followed, in program order, by a particular conditional branch instruction. More particularly, in various embodiments, an arithmetic instruction such as a subtract instruction, for example, may have two or more operands and may include a source register, a destination register, and an immediate operand. In one embodiment. the conditional branch instruction may be one of a compare branch zero (CBZ) instruction, or a compare branch not zero (CBNZ) instruction. These instructions may be supported in the Thumb instruction set of the ARM architecture. Both of these instructions will conditionally branch to a particular point (e.g., label) if the condition in a specified register is met. Accordingly, neither branch instruction uses the architectural condition code register or status flags to condition the branch. Instead, the result of the subtract instruction may be stored in the destination register. Therefore these types of instructions have not previously been fused. In one embodiment, if the destination register in the arithmetic instruction matches the register in the branch instruction, the fusion detect unit 214 may be configured to detect a match and to initiate an instruction fusion between the arithmetic instruction and the branch instruction. In one embodiment, the fusion detect unit 214 is configured to cause the arithmetic instruction and the branch instruction to be fused together such that a single micro-operation is formed. The single micro-operation includes execution information so that all of the ops in the separate instructions are now contained in the single micro-operation. In addition, that single micro-operation may be executed in one execution cycle by the execution core 208. For example, consider the following code sequence:

SUB R0, R1, R0 // read R0 and R1, subtract, write R0
CBZ R0, Label // read R0, calculate condition, branch if zero The fusion detect unit 214 may detect the occurrence of this instruction sequence and cause the ops from both instructions to be fused together to form one micro-op. For example, the above sequence may become:

SUB R0, R1, R2 // squashed (discarded)
CBZ R0, Label // read R1 and R2, subtract, write R0, calculate condition, branch if R0 is zero In one embodiment, while the arithmetic instruction may not set the architectural condition flags, the hardware in the adder that generates the signal that would have set the architectural flags may indeed still operate, and the signal is just not propagated to the architectural flags. Accordingly, the single fused micro-op need not wait for the result to propagate to the flags. For example, in this case, if the result of the subtract would have generated a zero flag, the signal may be present at the output of the adder and used without reading the flags, thus saving cycles. Even when an arithmetic or normal compare instruction does set the flags, these instructions may also be fused since the flag generating signal may be used rather than having to read the flags.

Operations generated by the decode unit 204 may be provided to the mapper 205. In one embodiment, the fusion detect unit 214 may provide control signals to the decode unit 204 and to the mapper 205 in response to detecting a fuse condition. In one embodiment, the mapper 205 may be configured to fuse the micro-ops from the two instructions into a single micro-op. More particularly, in one implementation the mapper 205 may include a merge unit 215 that perform the merge/fuse of the two micro-ops. The merge unit 215 may include multiplexing logic (not shown) that may selectively merge portions of one micro-op onto the other micro-op, and then apply a NOP to the micro-op that was not used. For example, given two decode lanes 0 and 1, if the SUB micro-op is on lane 0 and the CBZ micro-op is on lane 1, the merge unit 215 may merge the SUB micro-op onto the CBZ micro-op. FIG. 4A-FIG. 4D are diagrams depicting an embodiment of two micro-ops being merged into one micro-op.

Figure 4A:
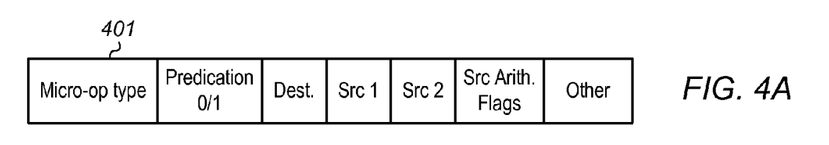
FIG. 4A through FIG. 4D depict example embodiments of micro-ops being fused together.
Figure 4B:
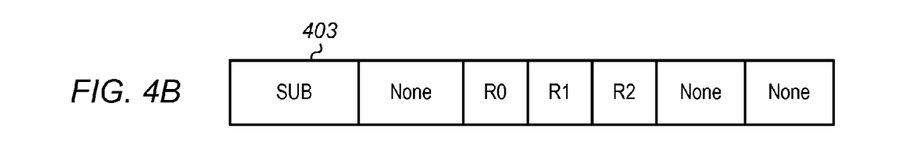
Figure 4C:
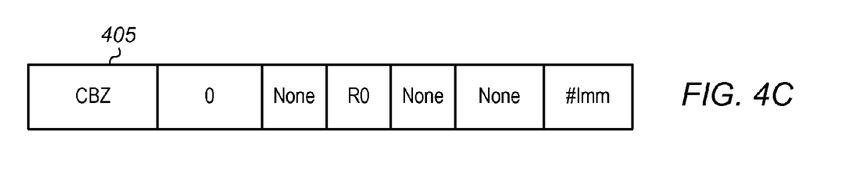
Figure 4D:
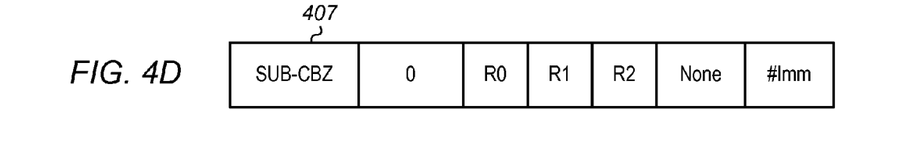

Referring now to FIG. 4A, the micro-op 401 includes a number of fields. As shown, the fields are starting from the left a micro-op type, predication condition, destination register, source register 1, source register 2, source arithmetic flags, and Other. In FIG. 4B, an example SUB micro-op 403 is shown. The micro-op 403 corresponds to the SUB instruction above. More particularly, the micro-op type is SUB, the predication is none, the destination register is R0, the Src 1 register is R1, the Src 2 register is R2, the Src arithmetic flags are none, and there is no other data. Similarly, in FIG. 4B, an example CBZ micro-op 405 is shown. The micro-op 405 corresponds to the CBZ instruction above. More particularly, the micro-op type is CBZ, the predication is 0 (which means predication is true when the result=0), the destination register is none, the Src 1 register is R0, the Src 2 register is none, the Src arithmetic flags are none, and there is immediate data. In FIG. 4D, a single micro-op resulting from the fusing of the micro-ops shown in FIG. 4B and FIG. 4C is shown. In one embodiment, the micro-op 403 has been merged onto the micro-op 405. Accordingly, the micro-op type of micro-op 407 is a SUB-CBZ, the predication is 0, the destination register is R0, the Src 1 register is R1, the Src 2 register is R2, the Src arithmetic flags is none, and the other is #Imm. As mentioned above, in one embodiment, the merge unit 215 may be configured to modify, replace, or leave as is, the fields in the CBZ micro-op. The SUB micro-op may then be discarded, as desired. It is noted that in other embodiments, the CBZ micro-op may be merged onto the SUB micro-op as desired.

Referring back to FIG. 3, the mapper 205 may provide the ops along with any dependency information to the scheduler 206. In one embodiment, the mapper 205 may implement register renaming to map source register addresses from the ops to the source operand numbers (SO#s) identifying the renamed source registers. Additionally, the mapper 205 may be configured to assign a scheduler entry to store each op, identified by the SCH#. In an embodiment, the SCH# may also be configured to identify the rename register assigned to the destination of the op. In other embodiments, the mapper 205 may be configured to assign a separate destination register number. Additionally, in one embodiment, the mapper 205 may be configured to generate dependency information for the ops.

The scheduler 206 may be configured to store the ops in the scheduler entries identified by the respective SCH#s, along with the SO#s and PCs. The scheduler may be configured to store the dependency information in dependency arrays that evaluate which ops are eligible for scheduling. The scheduler 206 may be configured to schedule the ops for execution in the execution core 208. When an op is scheduled, the scheduler 206 may be configured to read its source operands from the register file 207 and the source operands may be provided to the execution core 208. The execution core 208 may be configured to return the results of ops that update registers to the register file 207. In some cases, the execution core 208 may forward a result that is to be written to the register file 207 in place of the value read from the register file 207 (e.g. in the case of back to back scheduling of dependent ops).

The execution core 208 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 208 may be configured to execute predicted branch ops, and may receive the predicted target address that was originally provided to the fetch control unit 201. The execution core 208 may be configured to calculate the target address from the operands of the branch op, and to compare the calculated target address to the predicted target address to detect correct prediction or misprediction. The execution core 208 may also evaluate any other prediction made with respect to the branch op, such as a prediction of the branch op's direction. If a misprediction is detected, execution core 208 may signal that fetch control unit 201 should be redirected to the correct fetch target. Other units, such as the scheduler 206, the mapper 205, and the decode unit 204 may flush pending ops/instructions from the speculative instruction stream that are subsequent to or dependent upon the mispredicted branch.

The execution core 208 may include a data cache 209, which may be a cache memory for storing data to be processed by the processor 200. Like the instruction cache 202, the data cache 209 may have any suitable capacity, construction, or line size (e.g. direct mapped, set associative, fully associative, etc.). Moreover, the data cache 209 may differ from the instruction cache 202 in any of these details. As with instruction cache 202, in some embodiments, data cache 26 may be partially or entirely addressed using physical address bits. Correspondingly, a data TLB (DTLB) 210 may be provided to cache virtual-to-physical address translations for use in accessing the data cache 209 in a manner similar to that described above with respect to ITLB 203. It is noted that although ITLB 203 and DTLB 210 may perform similar functions, in various embodiments they may be implemented differently. For example, they may store different numbers of translations and/or different translation information.

The register file 207 may generally include any set of registers usable to store operands and results of ops executed in the processor 200. In some embodiments, the register file 207 may include a set of physical registers and the mapper 205 may be configured to map the logical registers to the physical registers. The logical registers may include both architected registers specified by the instruction set architecture implemented by the processor 200 and temporary registers that may be used as destinations of ops for temporary results (and sources of subsequent ops as well). In other embodiments, the register file 207 may include an architected register set containing the committed state of the logical registers and a speculative register set containing speculative register state.

The interface unit 211 may generally include the circuitry for interfacing the processor 200 to other devices such as memory 102, for example, on the external interface. The external interface may include any type of interconnect (e.g. bus, packet, etc.). The external interface may be an on-chip interconnect, if the processor 200 is integrated with one or more other components (e.g. a system on a chip configuration). The external interface may be on off-chip interconnect to external circuitry, if the processor 200 is not integrated with other components.

Figure 3:
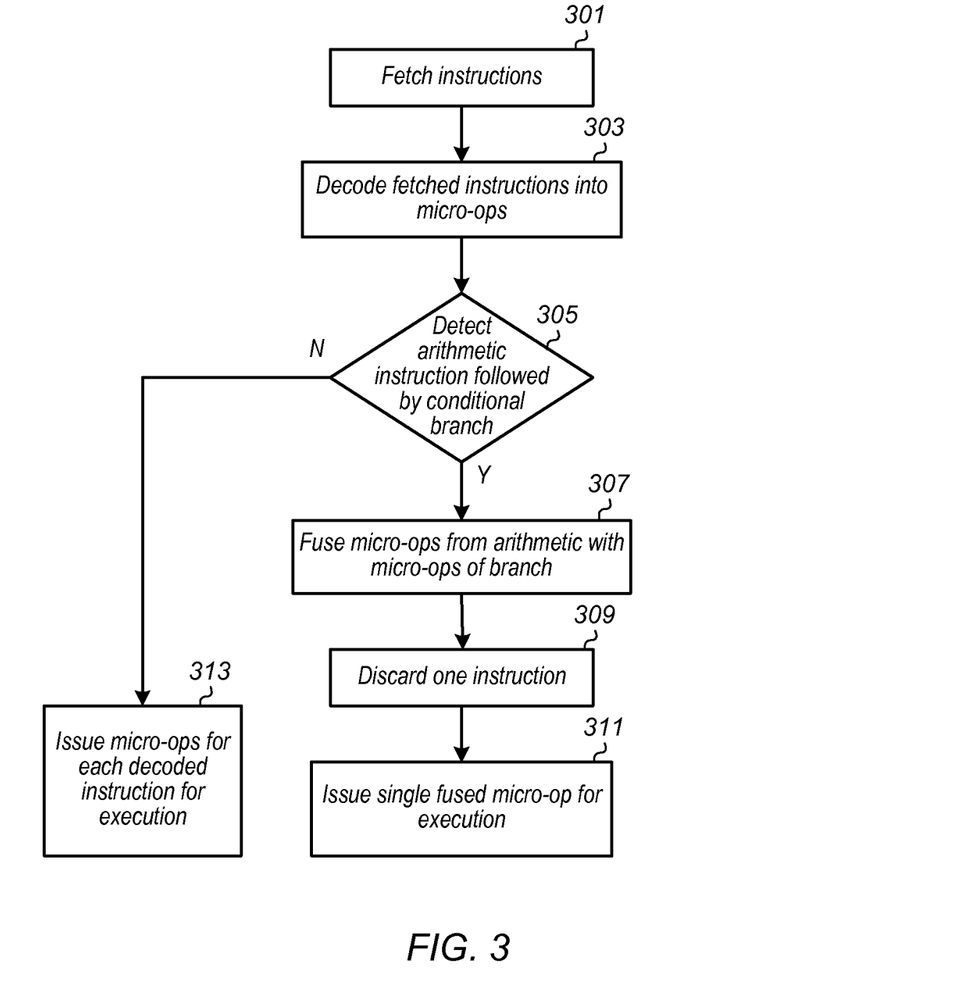
FIG. 3 is a flow diagram depicting the operation of the embodiments of the processor in FIG. 1 and FIG. 2.

In FIG. 3, a flow diagram depicting the operation of the embodiment of the processor of FIG. 1 and FIG. 2 is shown. Referring collectively to FIG. 1 through FIG. 3, and beginning in block 301 of FIG. 3, the fetch control unit 201 controls instruction fetch from the instruction cache 202. The decode unit 204 decodes the instructions into micro-ops (block 303). During the decode operation, the fusion detect unit 214 may detect arithmetic instructions followed by particular branch instructions, as described above (block 305). Specifically, the fusion detect unit 214 is configured to detect an arithmetic instruction followed by a conditional branch zero, or a conditional branch not zero instruction which has the same register operand as the destination register of the arithmetic instruction. If the fusion detect unit 214 does not detect the above sequence, the decoder 204 may provide micro-ops to the mapper 205 for further processing and issuance as described above in conjunction with the description of FIG. 2 (block 313).

However referring back to block 305, if the fusion detect unit 214 does detect the code sequence, the fusion detect unit 214 may be configured to provide control signals to the merge unit 215, which may fuse together into one micro-op the micro-op from the arithmetic instruction and the micro-op from the conditional branch instruction (block 307). The fusion detect unit 214 may discard the arithmetic instruction during the fusion process (block 309). The single micro-op may then be issued for execution by the execution core 208 (block 311). It is noted that in other embodiments, the merge unit 215 and thus the merging/fusing operation may implemented as part of the decode stage.

Figure 5:
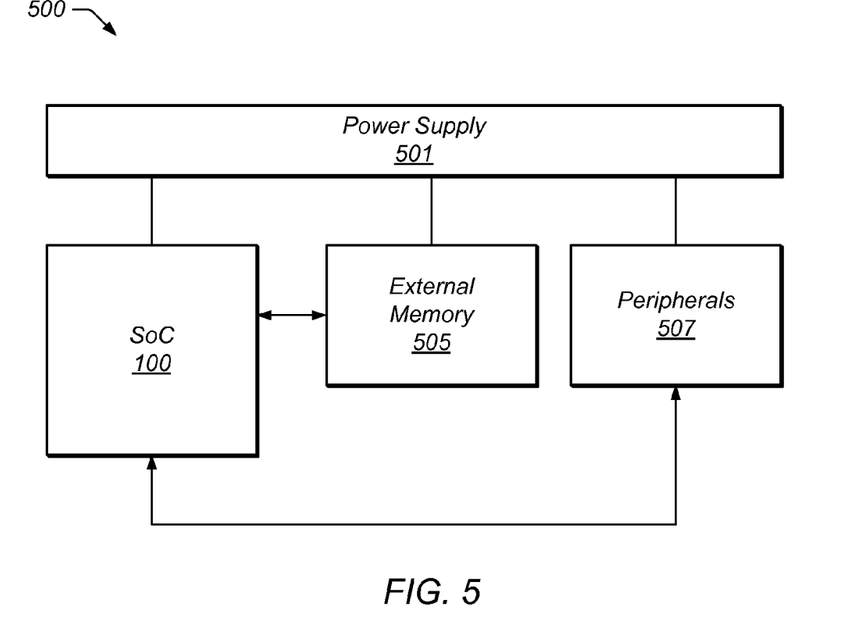
FIG. 5 is a block diagram of one embodiment of a system.

Turning to FIG. 5, a block diagram of one embodiment of a system that includes the SoC 100 of FIG. 1 is shown. The system 500 includes at least one instance of the SoC 100 of FIG. 1 coupled to one or more peripherals 507 and an external system memory 505. The system 500 also includes a power supply 501 that may provide one or more supply voltages to the SoC 100 as well as one or more supply voltages to the memory 405 and/or the peripherals 507. In some embodiments, more than one instance of the SoC 100 may be included.

The peripherals 507 may include any desired circuitry, depending on the type of system. For example, in one embodiment, the system 500 may be included in a mobile device (e.g., personal digital assistant (PDA), smart phone, etc.) and the peripherals 507 may include devices for various types of wireless communication, such as WiFi, Bluetooth, cellular, global positioning system, etc. The peripherals 507 may also include additional storage, including RAM storage, solid-state storage, or disk storage. The peripherals 507 may include user interface devices such as a display screen, including touch display screens or multitouch display screens, keyboard or other input devices, microphones, speakers, etc. In other embodiments, the system 500 may be included in any type of computing system (e.g., desktop personal computer, laptop, tablet, workstation, net top, etc.).

The system memory 505 may include any type of memory. For example, the system memory 505 may be in the DRAM family such as synchronous DRAM (SDRAM), double data rate (DDR, DDR2, DDR3, etc.), or any low power version thereof. However, system memory 505 may also be implemented in SDRAM, static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
an instruction fetch unit configured to fetch instructions from a memory;
a plurality of architectural flags, wherein at least one architectural flag is configured to store data indicative of a result of an execution of an instruction; and
an instruction decode unit coupled to the instruction fetch unit and configured to:
decode fetched instructions into micro-operations for execution by an execution unit;
detect an occurrence of an arithmetic instruction followed by a first branch instruction in program order, wherein the first branch instruction, upon execution, changes a program flow of control dependent upon a result of execution of the arithmetic instruction regardless of respective values of the plurality of architectural flags;
fuse together the arithmetic instruction and the first branch instruction such that a first single micro-operation is formed, wherein the first single micro-operation includes execution information based upon both the arithmetic instruction and the first branch instruction;
discard the arithmetic instruction in response to a formation of the first single micro-operation; and
an execution unit including an adder, wherein the execution unit is configured to:
execute the first single micro-operation;
wherein the adder is configured to generate a flag set signal using execution information based on the arithmetic instruction;
halt a propagation of the flag set signal to the plurality of architectural flags; and
generate a result of the first single micro-operation using the flag set signal regardless of the respective values of the plurality of architectural flags.

2. The processor of claim 1, wherein the first single micro-operation is executed in one execution cycle.

3. The processor of claim 1, wherein the first branch instruction comprises a compare branch which is conditional upon contents of a register specified in the arithmetic instruction.

4. The processor of claim 3, wherein the arithmetic instruction includes information specifying at least a source register and a destination register.

5. The processor of claim 4, wherein the instruction decode unit includes a fusion detect unit configured to detect that the destination register specified in the arithmetic instruction matches the register specified in the first branch instruction.

6. The processor of claim 4, wherein the arithmetic instruction when executed performs an arithmetic operation between at least two operands specified in the source register and the destination register and writes the result to the destination register, wherein the arithmetic operation includes a subtract operation (SUB), an addition operation (ADD), or reverse subtract operation (RSB).

7. The processor of claim 1, wherein the instruction decode unit is further configured to:
detect an occurrence of a logical instruction followed by a second branch instruction in program order, wherein the logical instruction, when executed, performs a logical operation between at least two operands specified in a source register and a destination register, respectively, and write a result of the logical operation to the destination register; and
fuse together the logical instruction and the second branch instruction such that a second single micro-operation is formed, wherein the second single micro-operation includes execution information based upon both the logical instruction and the second branch instruction.

8. The processor of claim 7, wherein the logical operation includes a logical OR (ORR) operation, a logical AND operation (AND), a logical Exclusive OR operation (EOR), or a bit clear operation (BIC).

9. A method comprising:
detecting an occurrence of a first branch instruction subsequent to an arithmetic instruction, wherein the first branch instruction, upon execution, changes a program flow of control dependent upon a result of execution of the arithmetic instruction regardless of respective values of a plurality of architectural flags;
fusing together the arithmetic instruction and the first branch instruction such that a first single micro-operation is formed, wherein the first single micro-operation includes operations from both the arithmetic instruction and the first branch instruction;
discarding the arithmetic instruction in response to a formation of the first single micro-operation;
executing the first single micro-operation;
generating, by an adder, a flag set signal using execution information based on the arithmetic instruction;
halting a propagation of the flag set signal to the plurality of architectural flags; and
generating a result of the first single micro-operation using the flag set signal regardless of the respective values of the plurality of architectural flags.

10. The method of claim 9, further comprising executing the first single micro-operation in one execution cycle.

11. The method of claim 10, wherein the first branch instruction comprises a compare branch zero (CBZ) which changes the program flow of control in response to detecting that contents of a register specified in the first branch instruction are equal to zero.

12. The method of claim 10, wherein the first branch instruction comprises a compare branch not zero (CBNZ) which changes the program flow of control in response to detecting that contents of a register specified in the first branch instruction are not equal to zero.

13. The method of claim 12, wherein detecting the occurrence of the first branch instruction subsequent to the arithmatic instruction includes detecting that a destination register specified in the arithmetic instruction matches the register specified in the first branch instruction.

14. The method of claim 12, further comprising:
detecting an occurrence of a logical instruction followed by a second branch instruction in program order, wherein the logical instruction, when executed, performs a logical operation between at least two operands specified in a source register and a destination register and writes a result of the logical operation to a destination resister; and
fusing together the logical instruction and the second branch instruction such that another single micro-operation is formed, wherein the another single micro-operation includes execution information based upon both the logical instruction and the second branch instruction.

15. A wireless mobile device comprising:
a memory configured to store program instructions; and
a processor coupled to the memory and configured to execute the program instructions, wherein the processor includes:
an instruction fetch unit configured to fetch instructions from the memory;
a plurality of architectural flags, wherein at least one architectural flag is configured to store data indicative of a result of an execution of an instruction; and
an instruction decode unit coupled to the instruction fetch unit and configured to decode fetched instructions into micro-operations for execution by an execution unit;
wherein the instruction decode unit is configured to detect an occurrence of an arithmetic instruction followed by a first branch instruction in program order, wherein the first branch instruction, upon execution, changes a program flow of control dependent upon a result of execution of the arithmetic instruction;
wherein the processor is further configured to:
fuse together the arithmetic instruction and the first branch instruction such that a first single micro-operation is formed, wherein the first single micro-operation includes execution information based upon both the arithmetic instruction and the first branch instruction;
discard the arithmetic instruction in response to a formation of the first single micro-operation; and
execute the first single micro-operation
wherein the processor includes an adder configured to generate a flag set signal using execution information based on the arithmetic instruction;
wherein the processor is further configured to:
halt a propagation of the flag set signal to the plurality of architectural flags; and
generate a result of the first single micro-operation using the flag set signal regardless of respective values of the plurality of architectural flags.

16. The wireless mobile device of claim 15, wherein the first single micro-operation is executed in one execution cycle.

17. The wireless mobile device of claim 15, wherein the instruction decode unit includes a fusion detect unit configured to detect that a destination register specified in the arithmetic instruction matches a register specified in the first branch instruction.

18. The wireless mobile device of claim 15, wherein the first branch instruction includes a compare branch zero (CBZ) which changes the program flow of control in response to detecting that contents of a register specified in the first branch instruction are equal to zero, or a compare branch not zero (CBNZ) which changes the program flow of control in response to detecting that contents of the register specified in the first branch instruction are not equal to zero.

19. The wireless mobile device of claim 15, wherein the instruction decode unit is further configured to detect an occurrence of a logical instruction followed by a second branch instruction in program order, wherein the logical instruction, when executed, performs a logical operation between at least two operands specified in a source register and a destination register and writes a result of the logical operation to a destination resister, and wherein the processor is further configured to fuse together the logical operation and the second branch instruction such that a second single micro-operation is formed, wherein the second single micro-operation includes execution information based upon both the logical instruction and the second branch instruction.

20. The wireless mobile device of claim 19, wherein the logical operation includes a logical OR (ORR) operation, a logical AND operation (AND), a logical Exclusive OR operation (EOR), or a bit clear operation (BIC).

* * * * *